United States Patent [19]

Stefan

[11] Patent Number: 5,894,178
[45] Date of Patent: Apr. 13, 1999

[54] ROTOR OF A TURBOGENERATOR HAVING PRESSURE GENERATING AND DEFLECTING FLOW CASCODE FOR DIRECT GAS COOLING

[75] Inventor: Ernö Stefan, Brugg, Switzerland

[73] Assignee: Asea Brown Boveri AG, Baden, Switzerland

[21] Appl. No.: 08/996,098

[22] Filed: Dec. 22, 1997

[30] Foreign Application Priority Data

Dec. 21, 1997 [DE] Germany .................. 196 53 839

[51] Int. Cl.$^6$ .................. H02K 9/00; H02K 9/08
[52] U.S. Cl. .................. 310/61; 310/58; 310/59; 310/60 R; 310/62; 310/63
[58] Field of Search .................. 310/52, 58, 59, 310/60 R, 61, 62, 63, 64

[56] References Cited

U.S. PATENT DOCUMENTS

| | | | |
|---|---|---|---|
| 4,465,947 | 8/1984 | Armor et al. | 310/59 |
| 4,910,958 | 3/1990 | Kreitmeier | 60/39.75 |
| 5,705,865 | 1/1998 | Ishida et al. | 310/62 |

FOREIGN PATENT DOCUMENTS

| | | |
|---|---|---|
| 1086335 | 8/1960 | Germany . |
| 120981 | 7/1976 | Germany . |
| 2834988 | 3/1979 | Germany . |
| 3424497C2 | 1/1985 | Germany . |
| 3925337A1 | 2/1991 | Germany . |
| 19548321C1 | 2/1997 | Germany . |

*Primary Examiner*—Nestor Ramirez
*Assistant Examiner*—Tran N. Nguyen
*Attorney, Agent, or Firm*—Burns, Doane, Swecker & Mathis, L.L.P.

[57] ABSTRACT

In an air-cooled electrical machine having reverse cooling in a closed cooling circuit, a two-stage blade cascade for the optimum incident flow of cooling air to the rotor (4) and the rotor winding (29) is provided between a rotor cap plate (22) and a rotor shaft (28). The first blade cascade stage (30b) in the direction of flow is a deceleration cascade having essentially pressure-generating properties, and the following blade cascade stage (30a) in the direction of flow is a deceleration cascade having essentially deflecting properties. The flow cascade is provided radially on the inside with a sealing shroud band (32).

10 Claims, 5 Drawing Sheets in the several laminated-body sections of the stator body, radial ventilation slots are provided.

ROTOR OF A TURBOGENERATOR HAVING PRESSURE GENERATING AND DEFLECTING FLOW CASCODE FOR DIRECT GAS COOLING

BACKGROUND OF THE INVENTION

Field of the Invention

The invention relates to a rotor of a turbogenerator having direct gas cooling.

The rotor of a turbogenerator having direct gas cooling has been disclosed, for example, by DD 120 981.

Discussion of Background

In generators which are operated according to the pressure-cooling principle, a main fan permits a swirled inflow of the cooling air into the overhang space of the pole zone of the rotor. That is, the residual swirl of the air at the outlet of the main fan ensures that the air rotates virtually without slip in front of the pole zone of the rotor. The inflow of cooling air into the mainly axial cooling passages, provided for this purpose, of the rotor and the rotor winding is therefore unproblematic in the case of the a pressure-cooling principle.

In order to additionally increase the coolant flow rate in the rotor, it is proposed in DD 120 981, in the case of generators cooled by the pressure-cooling principle, to intensify the cooling of the rotor and its winding by means of an additional moving-blade cascade under the rotor cap. This moving-blade cascade is able to further reduce the so-called shock losses, which remain despite a residual swirl of the cooling air, when the cooling air enters the essentially axially running rotor cooling passages, so that the cooling of the rotor is optimized and the total losses are reduced.

In contrast, the main fans of generators working by the suction-cooling principle direct the cooling air first of all to a cooler, in the course of which the residual swirl of the cooling-air flow is rendered turbulent. In general, suction cooling, compared with pressure cooling, offers the advantage that the air leaving the coolers can be fed directly to the cooling passages in the entire generator and the temperature increase caused by the machine fan is eliminated. In this way, however, cooling air is fed to the rotor without the requisite swirl. The rotor must accelerate the cooling air first of all to peripheral velocity before it an enter the cooling passages. The rotor must therefore perform all the work in order to overcome the shock losses already mentioned. In the process, separation of the cooling-gas flow may occur, and the incident flow to the inlets of the rotor conductor elements may be incorrect. The consequence is then a greatly restricted cooling-air distribution with a corresponding risk to the entire rotor winding.

Although the use of a moving-blade cascade according to DD 120 981 is able to reduce this problem in the rotor cooling, which occurs in particular during suction cooling, it is unable to meet today's requirements for the cooling of rotors in limit-rating machines. This is because it can be necessary here to deflect the cooling-gas flow by up to 70° during axial deflection, a factor which would lead to the separation of the flow boundary layer at the blade wall in the case of a blade row proposed according to the prior art.

SUMMARY OF THE INVENTION

Accordingly, one object of the invention is to provide a novel rotor of a turbogenerator having direct gas cooling of the generic type mentioned at the beginning, which rotor is preferably operated under suction cooling and can be cooled in an optimum manner.

This object is achieved by a rotor according to the present invention.

The advantages of the invention may be seen, inter alia, in the fact that, due to a two-stage flow cascade, a desired pressure increase of the coolant flow is forced on the one hand in a first stage, and the requisite deflection of the coolant flow is carried out on the other hand in a second stage. Only such a functional separation between pressure increase and deflection of the coolant flow ensures an optimum incident flow, provided with minimum shock losses, to the cooling passages in the rotor body and in the rotor winding when applying the suction-cooling principle.

In an especially preferred embodiment of the invention, provision is made for the first stage of the flow cascade having pressure-generating properties to face the main fan of the electrical machine, and for the second stage of the flow cascade having predominantly deflecting properties to face the rotor winding overhang. Here, the flow cascades are separated from one another in axial direction; that is, they do not overlap one another in axial direction.

An especially advantageous effect of the improved guidance of the coolant flow and thus of the cooling of the rotor appears if the walls between the inner margin of the rotor cap plate and the rotor shaft, which walls limit the coolant flow, have a contour converging conically toward the rotor winding overhang. In the event of a maximum increase in pressure, a so-called meridional contouring of the flow duct permits the requisite deflection while observing minimum flow losses.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
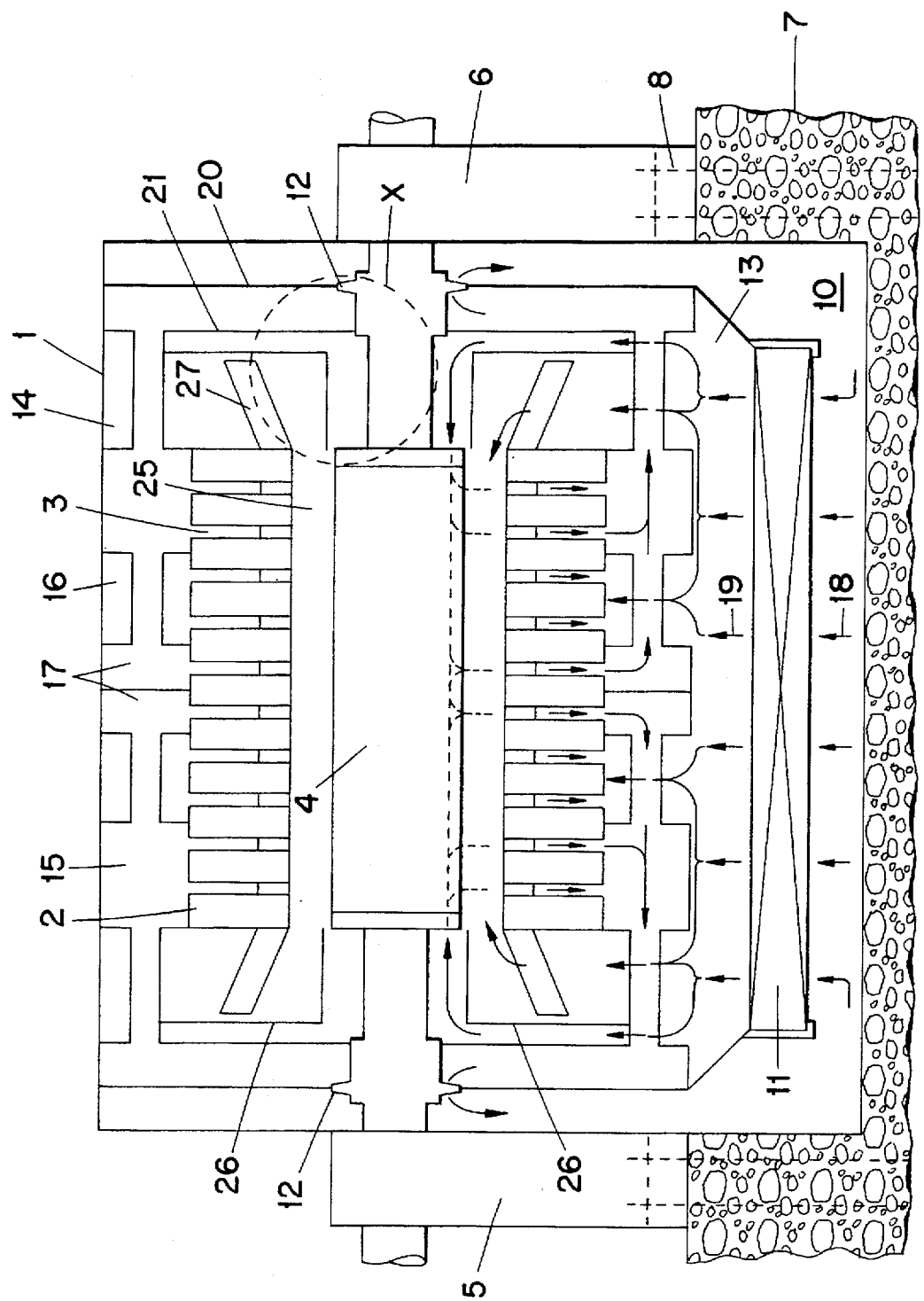
FIG. 1 shows a simplified longitudinal section through an air-cooled turbogenerator with closed cooling circuit according to the suction-cooling principle.

Referring now to the drawings, wherein like reference numerals designate identical or corresponding parts throughout the several views and only the elements essential for understanding the invention are shown, the air-cooled turbogenerator shown in FIG. 1 has a machine housing 1 which encloses a laminated stator body consisting of laminated-body sections 2. In the laminated stator body, radial ventilation slots 3 are provided between the individual laminated-body sections 2. A rotor 4 is mounted in thrust blocks 5, 6 which are fastened to the foundation 7 by means of tie rods 8.

The foundation 7 has a foundation pit 10 which extends axially over the entire length of the machine housing 1 and takes up virtually the entire width of the housing 1. A cooling arrangement 11 of the machine is arranged in this foundation pit 10. In this case, the inlet openings of the cooling arrangement 11 are connected to outflow spaces of main fans 12 arranged on both sides of the rotor 4, and the outlet openings of the cooling arrangement 11 lead into a compensating space 13. The cooling gas flowing through the cooling arrangement 11 is shown by means of arrows, in flowing hot gas being designated by 18 and outflowing cold gas being designated by 19. All further arrows not designated in more detail show the cooling circuit of the cooling gas. The cooling circuit is indicated by arrows merely in one machine half, since the machine is of symmetrical construction with regard to the cooling.

The cooling principle involves so-called reverse or suction, cooling in which hot gas 18 is fed to the cooling arrangement 11 by means of fans 12. The cooling-gas flow is apportioned in the compensating space 13 to the cold-gas chambers 14 and 16, in the course of which partial flows form. A first partial flow flows between baffle plates 26 and an inner casing 21 directly to the rotor 4, a second partial flow flows through the winding overhang 27 into the machine air gap 25, and a third cooling-gas flow passes through the cold-gas chambers 16 and ventilation slots 3 into the air gap 25. From the latter, the cooling-gas flow is drawn by the fans 12 through ventilation slots 3 and the hot-gas chambers 15 and 17 between the inner casing 21 and an outer casing 20 and is then directed through the foundation pit 10 to the coolers 11.

Figure 3:
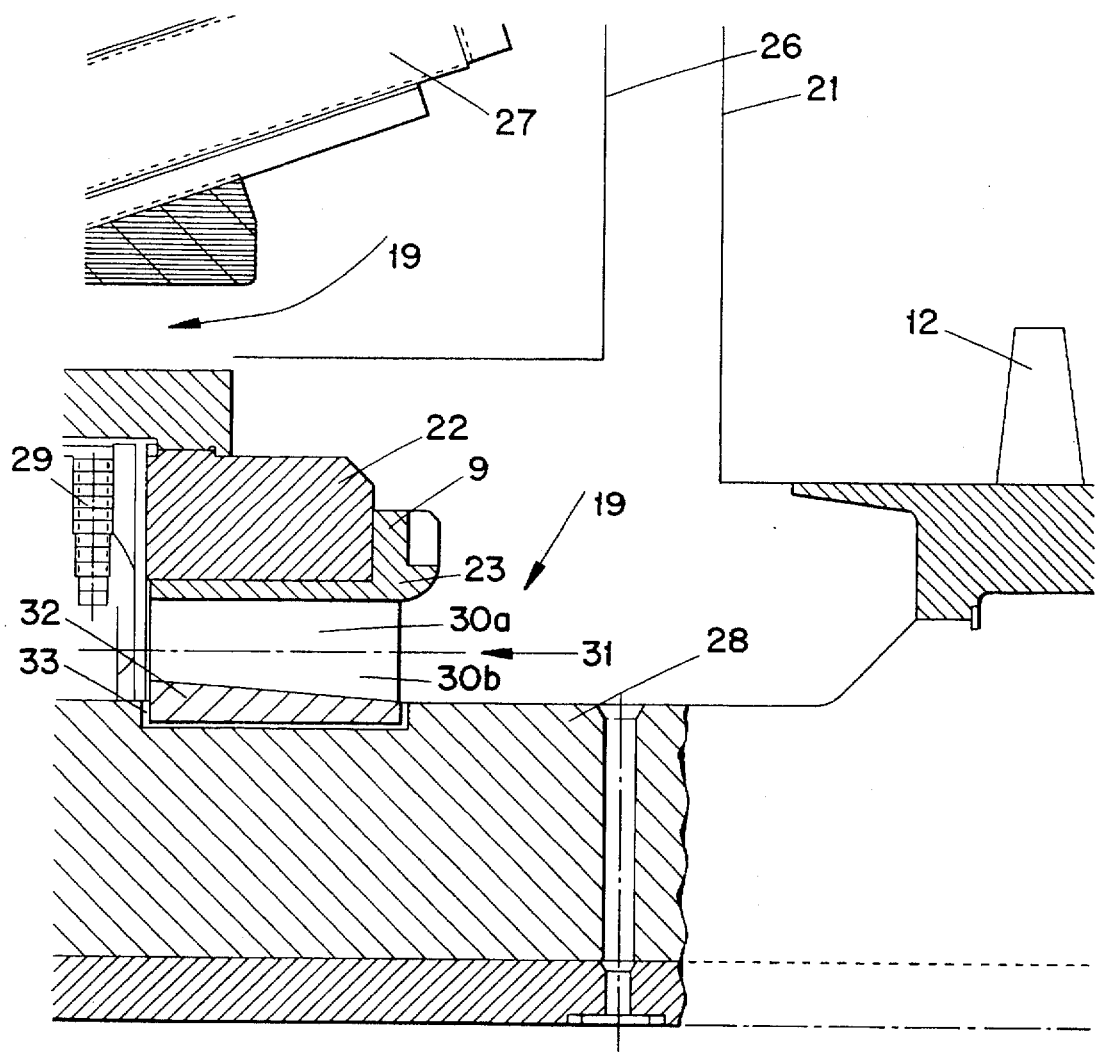
FIG. 3 shows the detail X according to FIG. 1 in a further longitudinal section.

FIG. 3, in an enlarged and thus more detailed sectional representation, shows the region of the cooling-gas feed to the rotor 4. The cooling air 19 flows between the baffle plate 26 and the inner casing 21 to a cooling-air inflow duct 31 which is formed between a rotor shaft 28 and a gas conduit ring 23. This flow duct 31 has a two-stage flow cascade 30a, 30b in the direction of flow toward a rotor winding 29, each flow-cascade stage in each case having a number of moving blades arranged on the inner periphery of the gas conduit ring 23. In this arrangement, the flow-cascade stages 30a, 30b are spaced apart in the axial direction of the rotor 4 in such a way that they do not overlap (cf. also FIG. 4). The flow-cascade stage 30b facing the fan 12 is designed as a deceleration stage having essentially pressure-generating properties, and the flow-cascade stage 30a following in the direction of flow and facing the rotor winding 29 is designed as a deceleration stage having essentially deflecting properties. To further optimize the flow of coolant 19 into the rotor 4, the flow duct 31 is provided radially inside the flow cascade 30a or 30b with a shroud band 32 which has a sealing effect with respect to the coolant flow. This shroud band 32 is inserted in a circumferential annular groove 33 of the rotor 28, and is thus secured against axial displacement.

The exemplary embodiment represented in FIG. 3 also shows a particular configuration of the shroud band 32 in such a way that the flow duct 31 is shaped in a fashion tapering conically towards the rotor winding 29. Such a so-called meridional contouring of the flow duct 31 permits minimum flow losses in conjunction with a two-stage maximum increase in pressure and requisite deflection.

Without departing from the concept of the invention, it is likewise conceivable additionally or exclusively to undertake contouring of the gas conduit ring 23, or else to abandon contouring of any sort, and thus to create a flow duct 31 of constant cross section. The last mentioned case is shown by way of example in FIG. 2.

Figure 2:
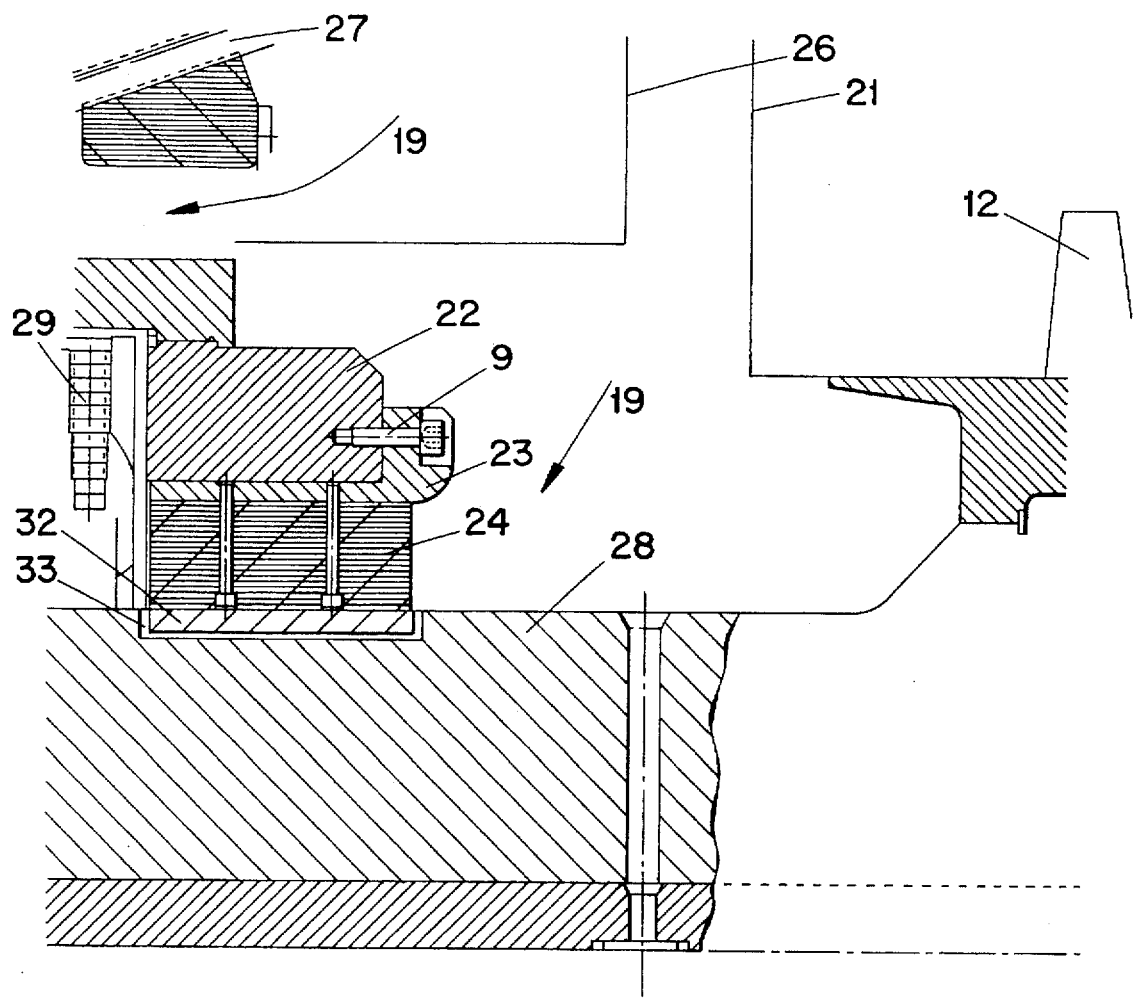
FIG. 2 shows the detail X according to FIG. 1 in enlarged and slightly more detailed longitudinal section.
Figure 4:
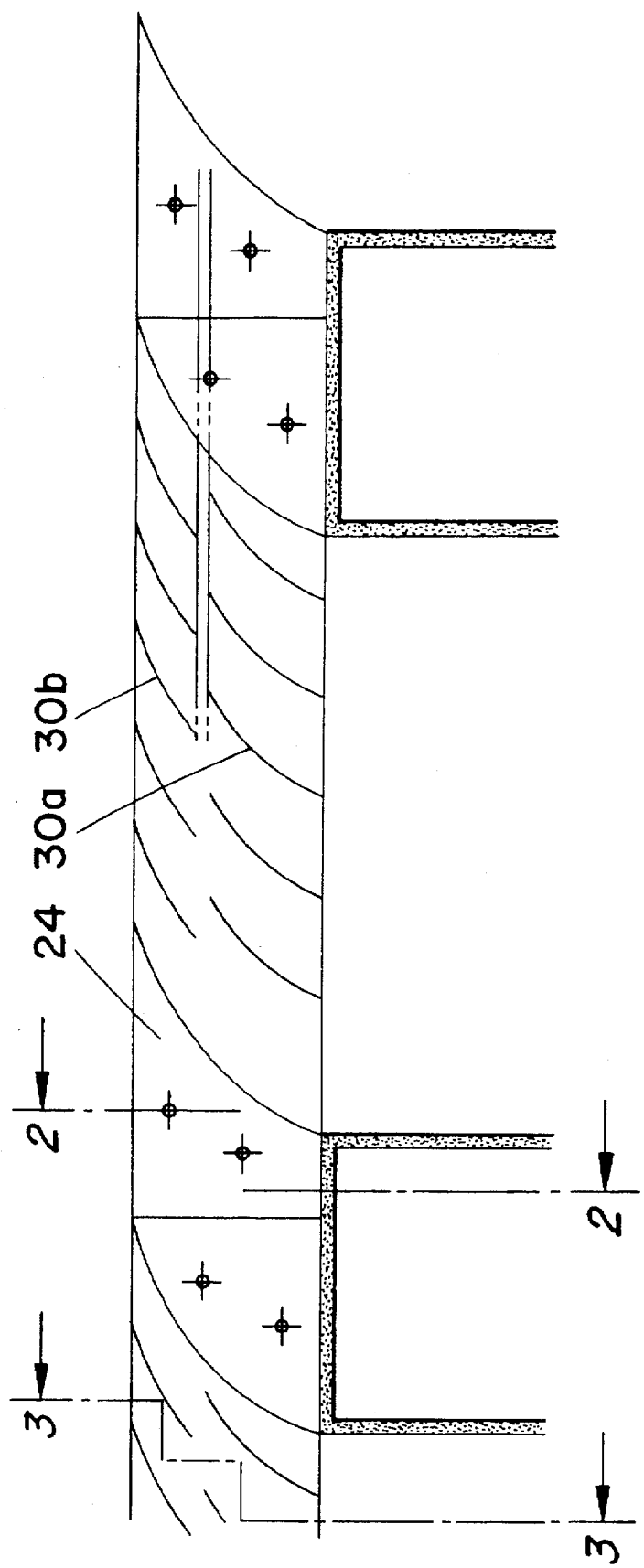
FIG. 4 shows a partial developed view of a gas conduit ring with flow cascade.

If the partial developed view of the inner periphery of the gas conduit ring 23 in FIG. 4 is considered, filling pieces 24 are provided here at regular intervals between adjacent moving blades of the individual flow-cascade stages, these filling pieces 24 being shaped in accordance with the blade contour of the flow-cascade stages 30a, 30b. FIG. 2 shows a longitudinal section through a filling piece 24 along the stepped section line A—A in FIG. 4.

Figure 5:
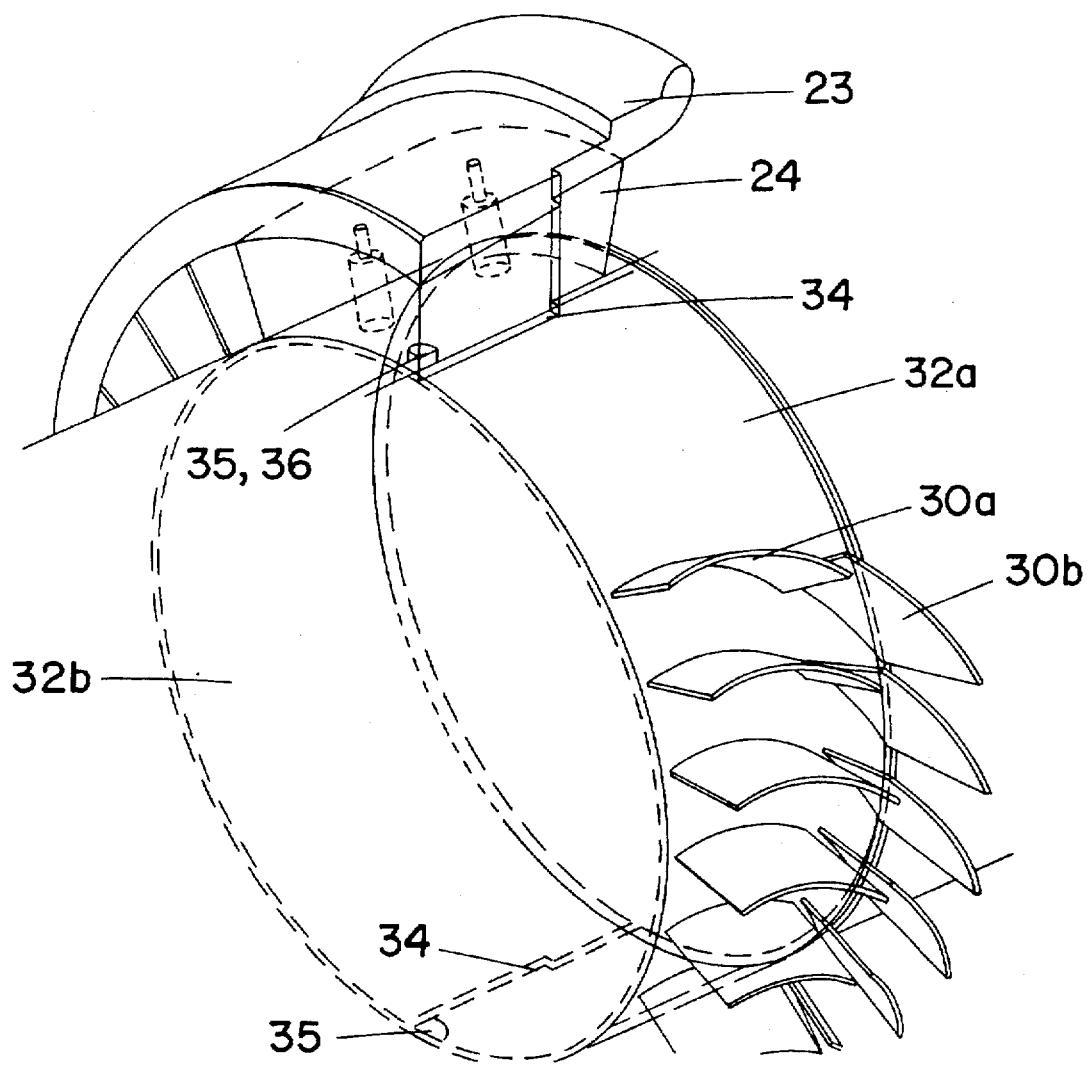
FIG. 5 shows a perspective sectional representation of the gas conduit ring with flow cascade and shroud band.

The gas conduit ring 23 bears with a flange in the axial direction against a rotor cap plate 22 and is connected to the latter by means of screws 9, as represented in FIG. 2. In order to ensure simple assembly and, if appropriate, disassembly of the gas conduit ring 23, the latter is designed in two parts, that is to say as two half rings. Also in two parts is the shroud band 32, as FIG. 5 makes clear. In the region of the filling pieces 24, both the gas conduit ring 23 and the shroud band 32a, 32b are divided at top and bottom along two lines of section 34. The line of section 34 is stepped here in the axial direction, a sealing effect thereby being achieved with respect to an axial coolant flow. The fillings pieces 24 and the shroud band halves 32a, 32b have mutually opposite cutouts 36 and 35 into which securing means such as pins, for example, are inserted against rotation of the shroud band halves 32a, 32b in the circumferential direction.

By the use of the blade-cascade stages described in conjunction with the sealing shroud band, a decisive reduction in the shock losses during the incident flow of coolant in rotors is achieved, an optimum incident flow to all rotor cooling passages being effected at higher coolant pressure. In this case, a coolant flow rate increased by up to 40% can be achieved compared with the prior art.

A blade-cascade arrangement having more than two blade-cascade stages, for example, would also be conceivable within the scope of the invention.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A rotor of a turbogenerator having direct gas cooling, comprising:
    a rotor cap plate having an inner edge;
    a rotor shaft;
    an annular flow duct between said rotor cap plate inner edge and said rotor shaft;
    a multi-stage flow cascade in said flow duct;
    wherein a first stage of said flow cascade is a deceleration stage having predominantly pressure-generating properties;
    wherein a second stage of said flow cascade is a deceleration stage having predominantly deflecting properties;
    said flow cascade further comprising a shroud band bounding said flow duct and positioned radially inside of said rotor cap plate; and
    wherein said first stage faces a main fan and said second stage faces a rotor winding overhang.

2. The rotor as claimed in claim 1, wherein said rotor has an axial direction, and wherein said first stage and said second stage do not overlap in said rotor axial direction.

3. The rotor as claimed in claim 1, wherein said multistage flow cascade is a two-stage flow cascade.

4. A rotor of a turbogenerator having direct gas cooling, comprising:
    a rotor cap plate having an inner edge;

a rotor shaft;

an annular flow duct between said rotor cap plate inner edge and said rotor shaft, said flow duct defining a flow direction;

a multi-stage flow cascade in said flow duct;

wherein a first stage of said flow cascade is a deceleration stage having predominantly pressure-generating properties;

wherein a second stage of said flow cascade is a deceleration stage having predominantly deflecting properties;

said flow cascade further comprising a shroud band bounding said flow duct and positioned radially inside of said rotor cap plate; and wherein said flow duct tapers conically along said flow direction.

5. The rotor as claimed in claim 4, wherein said shroud band is constructed in the shape of a conical frustum such that said flow duct has a conically tapering contour.

6. The rotor as claimed in claim 4, wherein said rotor has an axial direction, and wherein said first stage and said second stage do not overlap in said rotor axial direction.

7. The rotor as claimed in claim 4, wherein said multistage flow cascade is a two-stage flow cascade.

8. A rotor of a turbogenerator having direct gas cooling, comprising:

a rotor cap plate having an inner edge;

a rotor shaft having an axial direction;

an annular flow duct between said rotor cap plate inner edge and said rotor shaft;

a multi-stage flow cascade in said flow duct;

wherein a first stage of said flow cascade is a deceleration stage having predominantly pressure-generating properties;

wherein a second stage of said flow cascade is a deceleration stage having predominantly deflecting properties;

said flow cascade further comprising a shroud band bounding said flow duct and positioned radially inside of said rotor cap plate; and wherein said shroud band comprises at least two parts, a line of section between said at least two parts having a stepped course in said axial direction.

9. The rotor as claimed in claim 8, wherein said rotor has an axial direction, and wherein said first stage and said second stage do not overlap in said rotor axial direction.

10. The rotor as claimed in claim 8, wherein said multi-stage flow cascade is a two-stage flow cascade.

* * * * *